United States Patent
Lee et al.

(10) Patent No.: US 9,383,883 B2
(45) Date of Patent: Jul. 5, 2016

(54) TOUCH INPUT DEVICE AND METHOD

(71) Applicant: Samsung Electronics Co. Ltd., Suwon-si, Gyeonggi-do (KR)

(72) Inventors: Han-sung Lee, Seoul (KR); Chang-soo Lee, Seosan-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 63 days.

(21) Appl. No.: 14/021,670

(22) Filed: Sep. 9, 2013

(65) Prior Publication Data

US 2014/0071086 A1   Mar. 13, 2014

(30) Foreign Application Priority Data

Sep. 10, 2012 (KR) .................. 10-2012-0099736

(51) Int. Cl.
*G06F 3/046*   (2006.01)
*G06F 3/0354*  (2013.01)

(52) U.S. Cl.
CPC ............ *G06F 3/046* (2013.01); *G06F 3/03545* (2013.01)

(58) Field of Classification Search
CPC .............................. G06F 3/046; G06F 3/03545
USPC ...................... 345/156, 173; 178/18.01–20.01
See application file for complete search history.

(56) References Cited

U.S. PATENT DOCUMENTS

| | | | |
|---|---|---|---|
| 8,686,969 B2* | 4/2014 | Chen et al. ..................... | 345/174 |
| 8,890,829 B2* | 11/2014 | Cho .................... | G06F 3/03545 |
| | | | 345/173 |
| 2004/0125312 A1* | 7/2004 | You et al. ..................... | 349/149 |
| 2005/0083316 A1 | 4/2005 | Brain et al. | |
| 2009/0167727 A1 | 7/2009 | Liu et al. | |
| 2010/0084203 A1 | 4/2010 | Peng | |
| 2010/0085325 A1* | 4/2010 | King-Smith et al. ......... | 345/174 |
| 2010/0103133 A1 | 4/2010 | Park et al. | |
| 2011/0298748 A1 | 12/2011 | Chen et al. | |
| 2013/0009907 A1* | 1/2013 | Rosenberg ............. | G06F 3/046 |
| | | | 345/174 |
| 2013/0215074 A1* | 8/2013 | Lin .............................. | 345/174 |
| 2014/0002413 A1* | 1/2014 | Kim .............................. | 345/174 |
| 2014/0009435 A1* | 1/2014 | Shih et al. ..................... | 345/174 |
| 2014/0204498 A1* | 7/2014 | Smoot .................... | H01H 47/00 |
| | | | 361/144 |

FOREIGN PATENT DOCUMENTS

| | | |
|---|---|---|
| KR | 2011-0127107 A | 11/2011 |
| KR | 2011-0136953 A | 12/2011 |
| WO | 2010-111289 A2 | 9/2010 |

* cited by examiner

*Primary Examiner* — Temesgh Ghebretinsae
*Assistant Examiner* — Benyam Ketema
(74) *Attorney, Agent, or Firm* — Jefferson IP Law, LLP

(57) ABSTRACT

A touch input device and a touch input method are provided. The touch input device includes a first panel configured to be touched by an input tool having magnetic properties, a second panel configured to generate a magnetic field, and a control unit configured to control the second panel to generate the magnetic field in a portion of the second panel that is related to a touched location of the first panel, as the input tool touches the first panel.

20 Claims, 15 Drawing Sheets

(b)

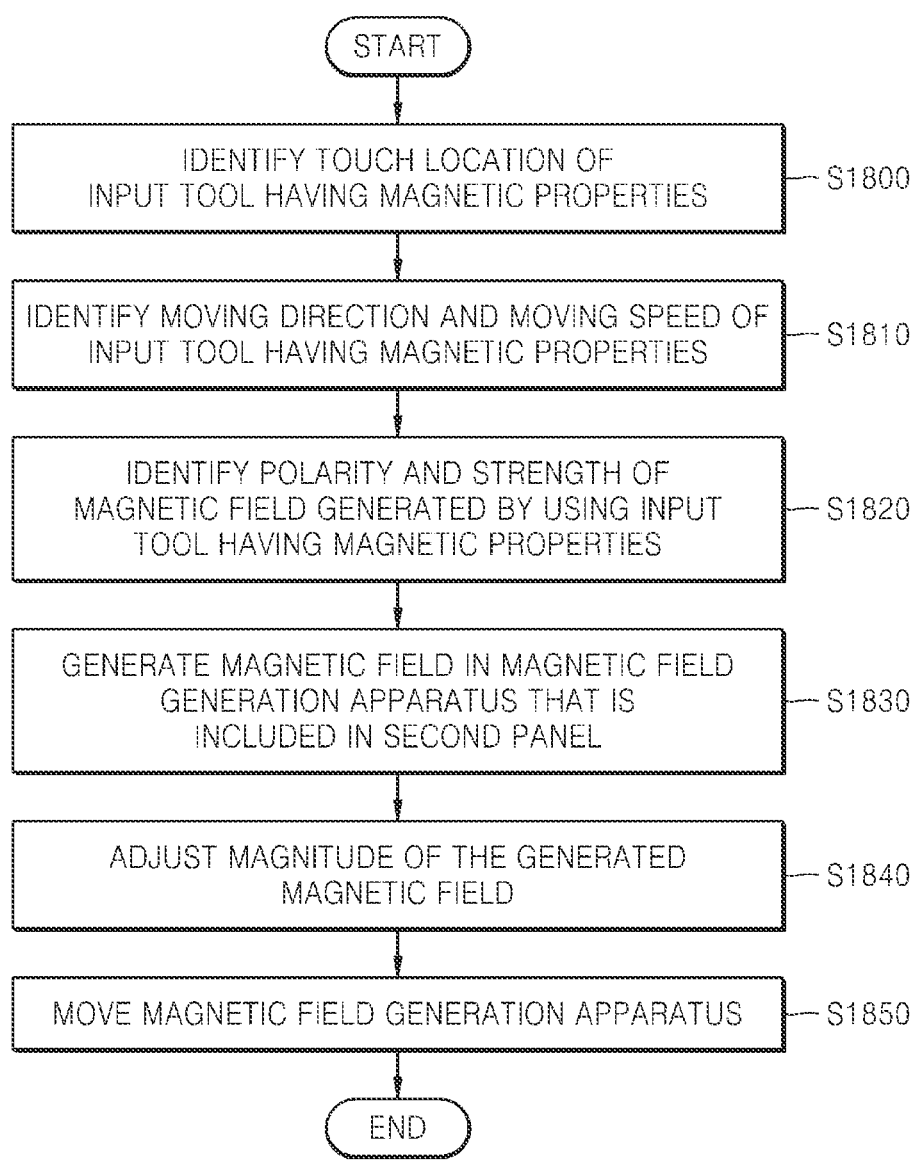

TOUCH INPUT DEVICE AND METHOD

CROSS-REFERENCE TO RELATED APPLICATION(S)

This application claims the benefit under 35 U.S.C. §119 (a) of Korean patent application filed on Sep. 10, 2012 in the Korean Intellectual Property Office and assigned Serial No. 10-2012-0099736, the entire disclosure of which is hereby incorporated by reference.

TECHNICAL FIELD

The present disclosure relates to a touch device and a touch input method to apply a repulsive force to an input tool which performs a touch input on a device.

BACKGROUND

Input methods of a device not only include a keypad, but also a touch screen, which receives a touch input of a user by incorporating a touch recognition apparatus in a screen of a device and are becoming widespread. Also, with the progress of touch input technologies, the user uses a touch input tool to perform various types of touch inputs to a device.

In the related art, when the user touches a touch screen, vibration is generated in a device and thus a feedback to the touch is provided. However, if the user uses the touch input tool and performs various types of touch inputs, such as touch, drag, flick, swipe, or pinch, a corresponding feedback may not be effectively provided to the user. Therefore, there is a need for a technology that may effectively provide a feedback to the touch input of the user to provide a predetermined writing feeling to the user.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a touch input device and a touch input method, which uses a magnetic field to provide a writing feeling to a user who performs a touch input by using an input tool having magnetic properties.

Additional aspects will be set forth in part in the description which follows and, in part, will be apparent from the description, or may be learned by practice of the presented various embodiments.

In accordance with an aspect of the present disclosure, a touch input device is provided. The touch input device includes a first panel configured to be touched by an input tool having magnetic properties, a second panel configured to generate a magnetic field, and a control unit configured to control the second panel to generate the magnetic field in a portion of the second panel that is related to a touched location of the first panel, as the input tool touches the first panel.

As the input tool touches and is moved along the first panel, the control unit may be configured to control the second panel to generate the magnetic field in the portion of the second panel that is related to the touched location of the first panel, based on a touch location and a moving direction of the input tool.

The control unit may be configured to control the second panel to generate the magnetic field, which has the same polarity as a polarity of the input tool, in a portion of the second panel that is in the moving direction of the input tool.

The control unit may be configured to control the second panel to generate the magnetic field, which has a polarity opposite to a polarity of the input tool, in a portion of the panel that is in the opposite direction of the moving direction of the input tool.

The second panel may include a plurality of coils. The control unit may be configured to control to apply a voltage to at least some of the plurality of coils to generate the magnetic field.

The control unit may be configured control to apply a voltage pulse having a predetermined period to at least some of the plurality of coils to generate the magnetic field.

As the input tool touches and is moved along the first panel, the control unit may be configured to adjust at least one of a period of the voltage pulse and a magnitude of the voltage pulse, based on a moving speed of the input tool.

The control unit may be configured to identify a magnetic field that is generated in at least some of the plurality of coils as the input tool is touched, and to identify at least one of a touch location, a moving direction, and a moving speed of the input tool.

The control unit may be configured to control to apply a voltage pulse having a predetermined period to at least some of the plurality of coils, and when a magnitude of the applied voltage equals zero, the control unit is configured to identify at least one of a touch location, a moving direction, and a moving speed of the input tool.

The plurality of coils may be arranged in the second panel in a grid pattern.

The first panel may include at least one of a protective panel and a display panel.

In accordance with another aspect of the present disclosure, a touch input device is provided. The touch input device includes a first panel configured to receive a touch input of an input tool having magnetic properties, a second panel configured to generate a magnetic field corresponding to the input of the input tool, and a control unit configured to control the second panel to generate the magnetic field in a portion of the second panel that is related to a touch input location, when the input tool contacts the first panel.

The control unit may be configured to receive information regarding a touch input from the first panel, and to control the first panel to generate the magnetic field in the portion of the second panel, based on the received information.

The first panel may include at least one of a Resistive (R)-type touch screen and a Capacitive (C)-type touch screen.

In accordance with another aspect of the present disclosure, a touch input method is provided. The touch input method includes identifying a location of a first panel that is touched by an input tool having magnetic properties, and applying a voltage to a portion of a second panel that is related to the identified touch location, as the input tool touches the first panel, in which a magnetic field is generated in the portion of the second panel as the voltage is applied.

In the applying of the voltage, as the input tool touches and is moved along the first panel, the voltage may be applied to generate the magnetic field in the portion of the second panel, based on a touch location and a moving direction of the input tool.

In the applying of the voltage, the voltage may be applied to generate the magnetic field, which has the same polarity as a polarity of the input tool, in the portion of the second panel that is in the moving direction of the input tool.

In the applying of the voltage, the voltage may be applied to generate the magnetic field, which has a polarity opposite to a polarity of the input tool, in a portion of the second panel that is in the opposite direction of the moving direction of the input tool.

In the applying of the voltage, the voltage may be applied to at least some of a plurality of coils included in the second panel.

In the applying of the voltage, a voltage pulse having a predetermined period may be applied to at least some of the plurality of coils to generate the magnetic field.

In the applying of the voltage, as the input tool touches and is moved along the first panel, at least one of a period of the voltage pulse and a magnitude of the voltage pulse may be adjusted, based on a moving speed of the input tool.

In the identifying of the touch location, the touch location may be identified by identifying the magnetic field formed by at least some of the plurality of coils, and may further include identifying at least one of a touch location, a moving direction, and a moving speed of the input tool.

In the applying of the voltage, a voltage pulse having a predetermined period may be applied to at least some of the plurality of coils, and in which at least one of a touch location, a moving direction, and a moving speed of the input tool is identified when a magnitude of the applied voltage equals zero.

The plurality of coils may be arranged in the second panel in a grid pattern.

The first panel may include at least one of a protective panel and a display panel.

In accordance with another aspect of the present disclosure, a non-transitory computer-readable recording medium having a program thereon for executing the method of the third embodiment is provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 18 is a flowchart illustrating a method in which a device moves a magnetic field generation apparatus, which is included in a second panel, by responding to a touch input of an input tool according to another embodiment of the present disclosure.

The same reference numerals are used to represent the same elements throughout the drawings.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the specification, it will also be understood that when an element is referred to as being "connected to" another element, it can be directly connected to the other element, or electrically connected to the other element while intervening elements may also be present. Also, when a part "includes" or "comprises" an element, unless there is a particular description contrary thereto, the part can further include other elements, not excluding the other elements.

As used herein, expressions such as "at least one of," when preceding a list of elements, modify the entire list of elements and do not modify the individual elements of the list.

Figure 1:
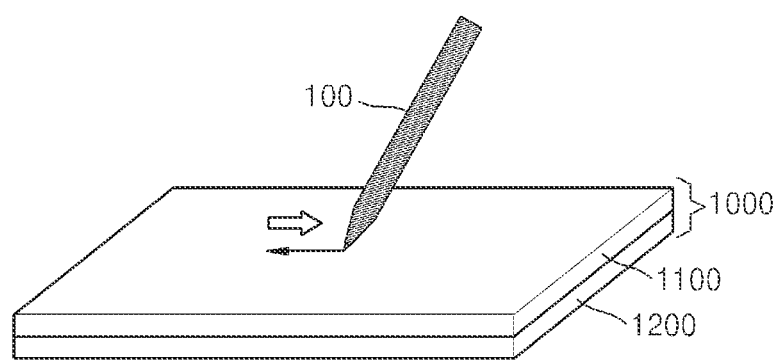
FIG. 1 is a schematic view illustrating a touch input performed on a device according to an embodiment of the present disclosure.

FIG. 1 is a schematic view illustrating a touch input performed on a device 1000 according to an embodiment of the present disclosure.

Referring to FIG. 1, a user may use an input tool 100 having magnetic properties to touch a first panel 1100 of the device 1000. The device 1000 may generate a magnetic field having a polarity opposite to that of the input tool 100 in a predetermined region of a second panel 1200, and thus apply a repulsive force to the input tool 100. The device 1000 may use the first and second panels 1100 and 1200 to identify a location touched by using the input tool 100 (hereinafter, referred to as "touch location of the input tool 100"). As the input tool 100 touches and is moved on the first panel 1100, the device 1000 may identify a moving direction and a moving speed of the input tool 100. Also, the device 1000 may use the second panel 1200 to identify a touch location of the input tool 100, and then generate a magnetic field in a predetermined location of the second panel 1200, and thus apply a repulsive force to the input tool 100.

The input tool 100 may be, for example, a stylus pen, and may be magnetic. The input tool 100 may include a magnet, and be partially or entirely magnetic, but the input tool 100 is not limited thereto. Therefore, when a magnetic field having a polarity opposite to that of the input tool 100 is generated in the second panel 1200, a predetermined repulsive force may be applied to the input tool 100.

The first panel 110 of the device 1000, for example, may include at least one of a protective panel, a display panel, a Resistive (R)-type touch screen, and a Capacitive (C)-type touch screen. The second panel 1200 may generate a magnetic field by using a predetermined voltage.

The first panel 1100 and the second panel 1200 may be adjacent to each other, but are not limited thereto. The first and second panels 1100 and 1200 may be formed as a single panel.

Figure 2:
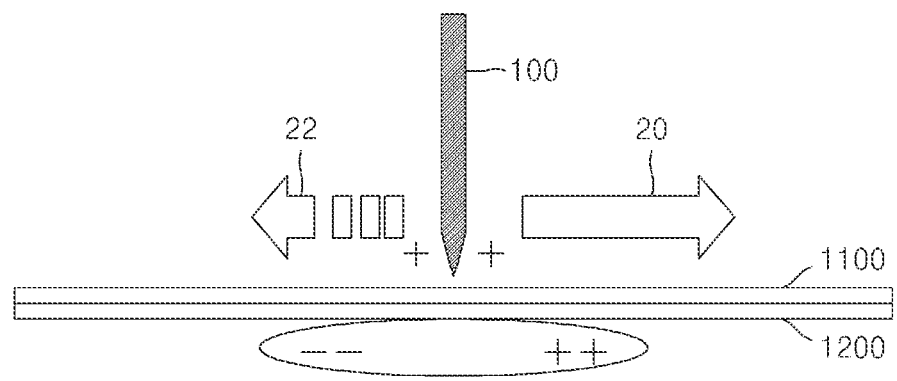
FIG. 2 is a schematic view illustrating a force applied to an input tool according to an embodiment of the present disclosure.

FIG. 2 is a schematic view illustrating a force applied to the input tool 100 according to an embodiment of the present disclosure.

Referring to FIG. 2, when the user touches the first panel 1100 by using the input tool 100 having a positive polarity and moves the input tool 100 in a direction 20, the device 1000 may use the first panel 1100 or the second panel 1200 to identify a touch location, a moving direction, and a moving speed of the input tool 100. For example, if the first panel 1100 is at least one of an R-type touch screen and a C-type touch screen, the device 1000 may identify a touch location, a moving direction, and a moving speed of the input tool 100 by using the first panel 1100.

Also, the device 1000 may generate a positive magnetic field in a region of the second panel 1200 corresponding to a direction 20 from the touch location; and generate a negative magnetic field in a region of the second panel 1200 corresponding to a direction 22 from the touch location. In this case, the direction 20 and the direction 22 may be opposite to each other. Also, when the positive and negative magnetic fields are generated, a predetermined repulsive force may be applied to the input tool 100.

Figure 3:
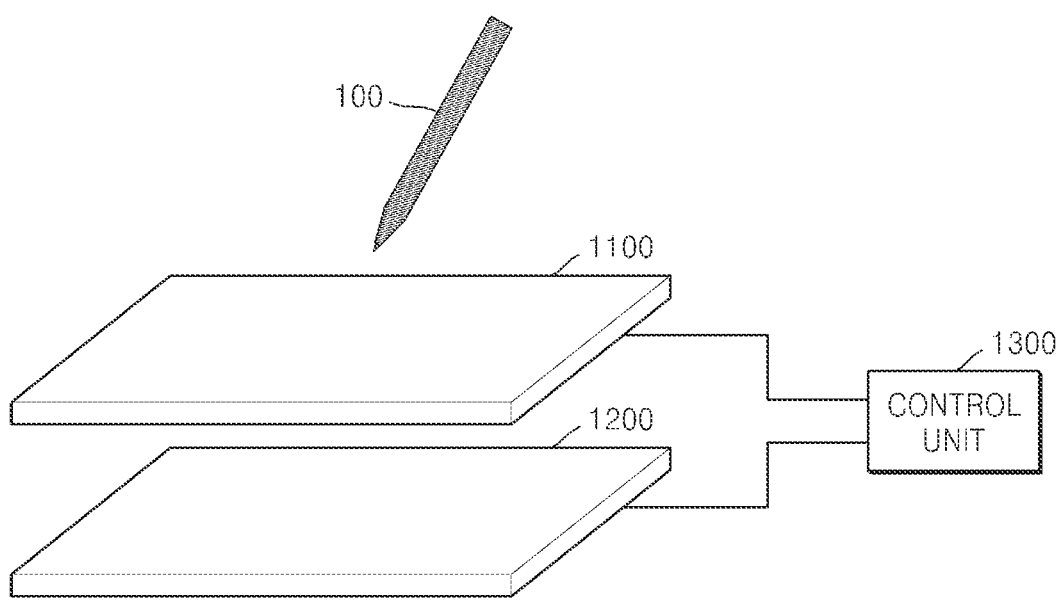
FIG. 3 is a diagram of the device according to an embodiment of the present disclosure.

FIG. 3 is a diagram of the device 1000 according to an embodiment of the present disclosure.

Referring to FIG. 3, the device 1000 includes the first panel 1100, the second panel 1200, and a control unit 1300.

The first panel 1100 may be at least one of a touch panel, a display panel, an R-type touch screen, and a C-type touch screen. The user may use the input tool 100 to touch the first panel 1100.

When the first panel 1100 senses a touch of the input tool 100, the first panel 1100 may provide a signal that is generated according to the touch of the input tool 100 to the control unit 1300. The control unit 1300 may use the signal that is received from the first panel 1100 to identify a touch location, a moving direction, and a moving speed of the input tool 100.

When the first panel 1100 senses a touch of the input tool 100, the control unit 1300 may use the second panel 1200 to identify a touch location, a moving direction, and a moving speed of the input tool 100.

The second panel 1200 may generate a magnetic field. When the control unit 1300 applies a voltage to the second panel 1200, the second panel 1200 may generate a magnetic field at least in a portion of the second panel 1200.

The second panel 1200 may include a plurality of coils that may generate a magnetic field. The plurality of coils may be separately arranged by a predetermined distance. For example, a plurality of wires may be arranged vertically and horizontally on the second panel 1200, and the plurality of coils may be respectively disposed at locations where the vertically arranged wires meet the horizontally arranged wires. Also, both ends of each coil may be respectively connected to the vertically and horizontally arranged wires. Therefore, when a predetermined voltage is applied to a coil through the vertically and horizontally arranged wires, the coil included in the second panel 1200 may generate a predetermined magnetic field. However, a method of generating a magnetic field is not limited thereto, and at least in a portion of the second panel 1200, a magnetic field may be generated by using various means for generating a magnetic field, such as a magnet, or a coil.

When the input tool 100 touches the first panel 1100, a magnetic field may be generated in a predetermined region of the second panel 1200 due to the magnetic properties of the input tool 100, and then a predetermined electric field may be generated in the plurality of coils included in the second panel 1200 due to the generated magnetic field. Also, the second panel 1200 or the control unit 1300 may sense or measure the electric field generated in the plurality of coils. In addition, the electric field that is generated in the plurality of coils by using the input tool 100 having magnetic properties may be sensed or measured while a voltage is not applied to the plurality of coils. Information regarding an electric field may include, for example, information regarding a polarity of the electric field and strength of the electric field.

The polarity and strength of the magnetic field that is generated by using the input tool 100 may be identified based on the polarity and strength of the electric field that is generated in the plurality of coils in the second panel 1200. When the second panel 1200 senses or measures the electric field generated in the plurality of coils, the second panel 1200 may provide information regarding the sensed or measured electric field to the control unit 1300.

The second panel 1200 may contact a lower portion of the first panel 1100. A size of the second panel 1200 may be the same as that of the first panel 1100. However, the size of the second panel 1200 is not limited thereto, and the second panel 1200 may be smaller than the first panel 1100.

When the second panel 1200 is smaller than the first panel 1100, the second panel 1200 may be moved under a portion of the first panel 1100 that is touched by using the input tool 100. In this case, the first panel 1100 may sense a touch of the input tool 100, and then the second panel 1200 may be moved according to a touch location sensed by the first panel 1100.

The control unit 1300 identifies the touch of the input tool 100 and generates a magnetic field in a predetermined location of the second panel 1200. When the first panel 1100 senses a touch of the input tool 100, the control unit 1300 may receive information regarding the touch of the input tool 100 from the first panel 1100, and may identify a touch location, a moving direction, and a moving speed of the input tool 100 based on the received information. For example, if the first panel 1100 is an R-type touch screen or a C-type touch screen, the control unit 1300 may sense the touch of the input tool 100. Alternatively, if the first panel 1100 does not sense a touch of the input tool 100, the control unit 1300 may receive information regarding the touch of the input tool 100 from the second panel 1200, and may identify a touch location, a moving direction, and a moving speed of the input tool 100 based on the received information.

The control unit 1300 may generate a magnetic field in a predetermined location of the second panel 1200. The control unit 1300 may apply a voltage to a predetermined coil included in the second panel 1200, and accordingly, the predetermined coil may generate a magnetic field. The control unit 1300 may select a coil to which a voltage is to be applied, based on a touch location, a moving direction, and a moving speed of the input tool 100, and then may apply a predetermined voltage to the selected coil. In this case, the control unit 1300 may determine whether to apply a positive voltage or a negative voltage to the selected coil, with respect to a polarity of a magnetic field that is generated by using the input tool 100.

The control unit 1300 may determine and adjust a magnitude of a voltage to be applied, based on at least one of the strength of a magnetic field that is generated by using the input tool 100, and a moving speed of the input tool 100. For example, if the strength of a magnetic field is great or a moving speed of the input tool 100 is high, the control 1300 unit may increase the magnitude of a voltage to be applied to a coil of the second panel 1200 to generate a strong magnetic field. Also, when the strength of a magnetic field that is generated by using the input tool 100 is great or a moving speed of the input tool 100 is high, the control unit 1300 may increase the number of coils to which a voltage is to be applied.

The control unit 1300 may apply a voltage pulse having a predetermined period to a coil included in the second panel 1200. While a voltage pulse having a predetermined period is applied, when a voltage is applied to a coil, the coil may generate a magnetic field; and when the voltage is not applied to a coil, the control unit 1300 may sense a magnetic field that is generated by using the input tool 100 and an electric field in the coil that is generated due to the generated magnetic field, by using the coil.

The control unit 1300 may adjust a period of a voltage pulse and the magnitude of a voltage pulse, based on a touch location, a moving direction, and a moving speed of the input tool 100. For example, if the strength of a magnetic field generated by using the input tool 100 is great or a moving speed of the input tool 100 is high, the control unit 1300 may increase the magnitude of a voltage pulse and reduce the period of the voltage pulse.

When the second panel 1200 is smaller than the first panel 1100, the control unit 1300 may generate a magnetic field in the second panel 1200, and move the second panel 1200 under the first panel 1100. The control unit 1300 may use the first panel 1100 to identify a touch location, a moving direction, and a moving speed of the input tool 100, and then move the second panel 1200 under a portion of the first panel 1100 that is touched by using the input tool 100.

Figure 4:
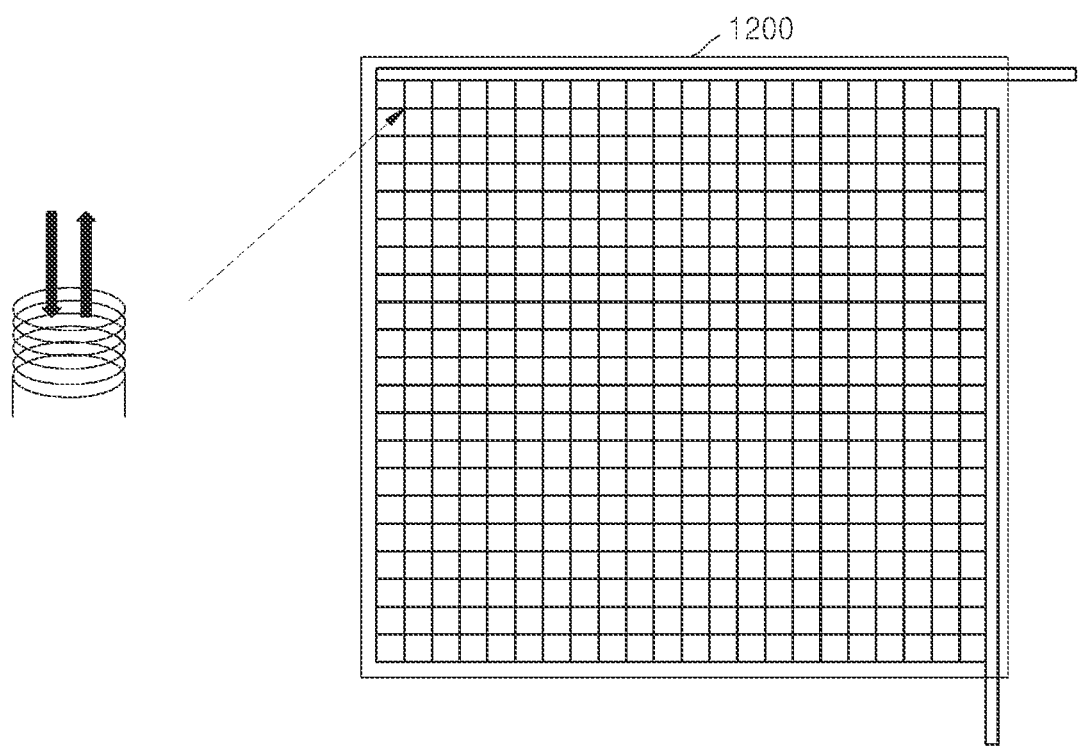
FIG. 4 illustrates a second panel and a coil included in the second panel according to an embodiment of the present disclosure.

FIG. 4 illustrates the second panel 1200 and coils included in the second panel 1200 according to an embodiment of the present disclosure.

Referring to FIG. 4, the second panel 1200 may include the plurality of coils that may generate a magnetic field. The wires may be arranged vertically and horizontally on the second panel 1200, and the plurality of coils may be respectively disposed at locations where the vertically arranged wires meet the horizontally arranged wires.

In addition, both ends of each coil may be respectively connected to the vertically and horizontally arranged wires, and accordingly, the plurality of coils may be controlled by using the respectively connected wires. For example, when a predetermined voltage is applied to a coil through the vertically and horizontally arranged wires, the coil included in the second panel 1200 may generate a predetermined magnetic field. In this case, depending on whether a positive voltage or a negative voltage is applied to the coil, magnetic fields having different polarities may be generated in the coil. Also, the plurality of coils may include a predetermined dielectric material.

A predetermined measurement apparatus (not shown) may be connected to the vertically and horizontally arranged wires. The measurement apparatus may measure a voltage of both ends of a coil and current flowing in the coil to identify properties of the coil. For example, the measurement apparatus may identify a polarity and strength of a magnetic field that is generated in a coil, but is not limited thereto.

Figure 5A:
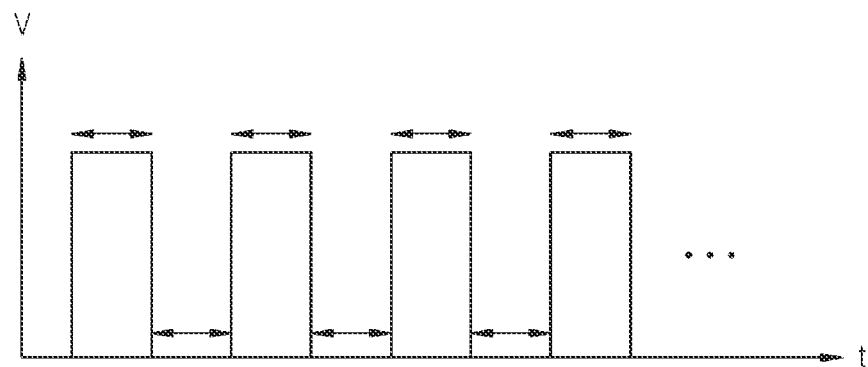
FIGS. 5A and 5B illustrate a voltage pulse applied to a second panel according to an embodiment of the present disclosure.
Figure 5B:
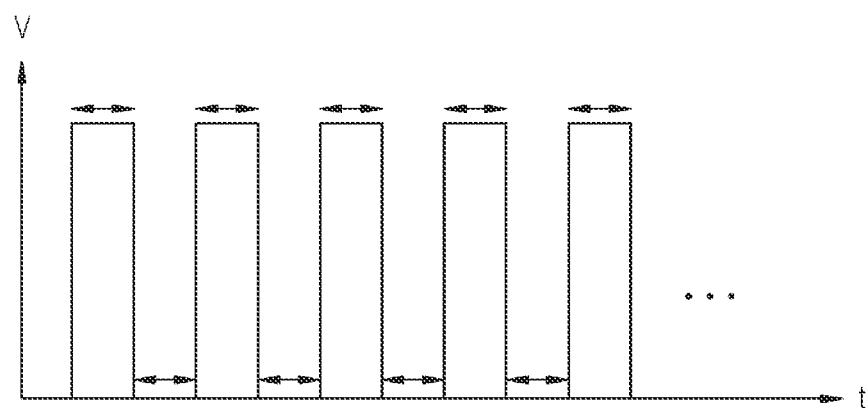

FIGS. 5A and 5B illustrate a voltage pulse applied to the second panel 1200 according to an embodiment of the present disclosure.

According to an embodiment of the present disclosure, the device 1000 may use a predetermined voltage application apparatus (not shown) to apply a voltage pulse having a predetermined period, as shown in FIGS. 5A and 5B, to a predetermined coil included in the second panel 1200.

Referring to FIG. 5A, when a voltage is applied to a coil, a predetermined magnetic field may be generated in the coil. Also, when the voltage is not applied to a coil, the control unit 1300 may sense or measure an electric field that is generated in the coil due to a magnetic field, which is generated by using the input tool 100.

In addition, the device 1000 may adjust the strength of a voltage to be applied to a coil and a period of a voltage pulse to be applied to the coil, based on the strength of an electric field generated in the coil and a moving speed of the input tool 100. For example, when the device 1000 is applying a voltage pulse having a period shown in FIG. 5A to a coil, if a moving speed of the input tool 100 increases, the device 1000 may adjust a magnitude and a period of a voltage pulse and thus may apply a voltage pulse having a period shown in FIG. 5B to the coil.

Figure 6:
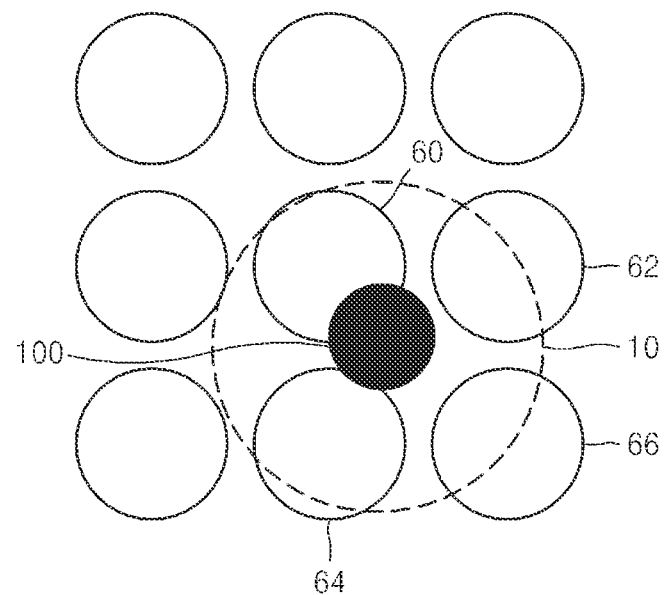
FIG. 6 illustrates a method by which a device determines a touch location, a moving direction and a moving speed of an input tool according to an embodiment of the present disclosure.

FIG. 6 illustrates a method by which the device 1000 determines a touch location, a moving direction, and a moving speed of the input tool 100 according to an embodiment of the present disclosure.

Referring to FIG. 6, a magnetic field may be generated within a predetermined range 10 formed around a touch location of the input tool 100. As a magnetic field is being generated, electric fields may be generated in coils 60, 62, 64, and 66. Also, the control unit 1300 may compare polarities and strengths of the electric fields respectively generated in the coils 60, 62, 64, and 66, and thus may identify a touch location of the input tool 100. For example, when the strength of an electric field formed by using the input tool 100 is 40% in the coil 60, 17% in the coil 62, 30% in the coil 64, and 13% in the coil 66, the control unit 1300 may estimate a touch location of the input tool 100 based on the respective locations of the coils 60, 62, 64, and 66 and the measured electric fields in the coils 60, 62, 64, and 66.

Figure 7A:
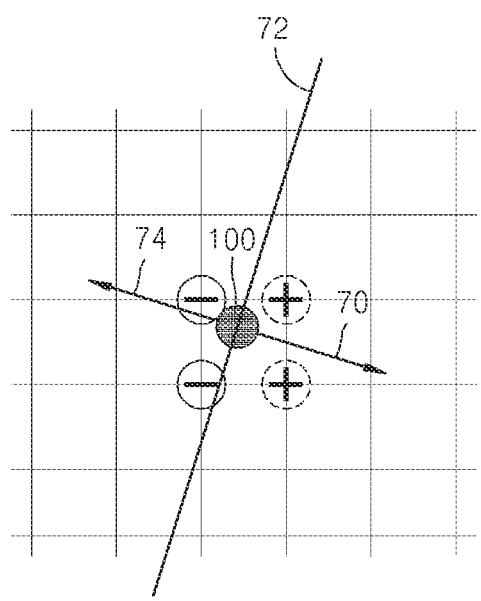
FIGS. 7A and 7B illustrate a device generating a magnetic field in a second panel according to an embodiment of the present disclosure.
Figure 7B:
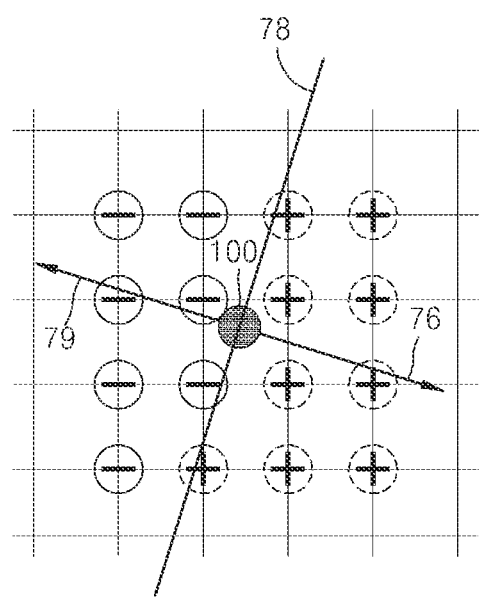

FIGS. 7A and 7B illustrate the device 1000 generating a magnetic field in the second panel 1200 according to an embodiment of the present disclosure. The input tool 100 may have a positive magnetic polarity.

Referring to FIG. 7A, when the input tool 100 touches the device 1000 and is moved in a direction 70, the device 1000 may generate a positive magnetic field in a predetermined coil disposed in the direction 70, with respect to an imaginary line 72 which passes through a location touched by the input tool 100 and is perpendicular to the direction 70. Alternatively, the device 100 may generate a negative magnetic field in a predetermined coil disposed in the opposite direction of the direction 70 (i.e., direction 74), with respect to the imaginary line 72.

Referring to FIG. 7B, if the input tool 100 is moved in a direction 76 with respect to the imaginary line 78 at a speed faster than a speed described with reference to FIG. 7A, the device 1000 may generate a magnetic field in more coils than described with reference to FIG. 7A (e.g., a positive magnetic field in a predetermined coils disposed in the direction 76 or a negative magnetic field in a predetermined coils disposed in the direction of the direction 79).

FIGS. 8A through 10C illustrate examples in which the device 1000 generates a magnetic field in the second panel 1200 when the input tool 100 moves diagonally on the second panel 1200 according to an embodiment of the present disclosure. In FIGS. 8A through 10C, the input tool 100 may have a positive magnetic polarity.

Figure 8A:
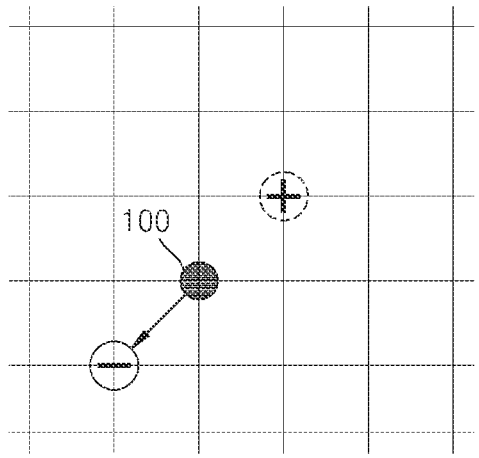
FIGS. 8A, 8B, 8C, 9A, 9B, 9C, 10A, 10B, and 10C illustrate examples in which a device generates a magnetic field in a second panel when an input tool moves diagonally on the second panel according to an embodiment of the present disclosure.
Figure 8B:
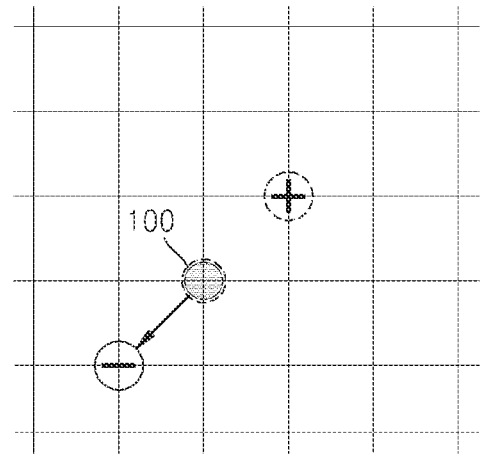
Figure 8C:
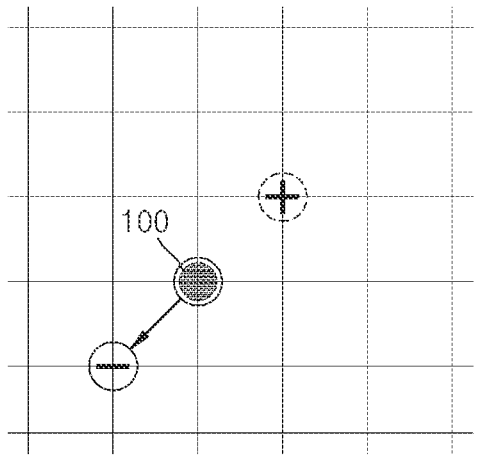

Referring to FIG. 8A, when the input tool 100 moves diagonally in between wires arranged in a grid pattern, the device 1000 may generate a negative magnetic field in a coil disposed in a direction that the input tool 100 moves in (hereinafter, referred to as "moving direction of the input tool 100"), and a positive magnetic field in a coil disposed in a direction opposite to the moving direction of the input tool 100. Alternatively, the device 1000 may generate either a positive magnetic field, as shown in FIG. 8B, or a negative magnetic field, as shown in FIG. 8C, in a coil disposed at a location of the input tool 100.

Figure 9A:
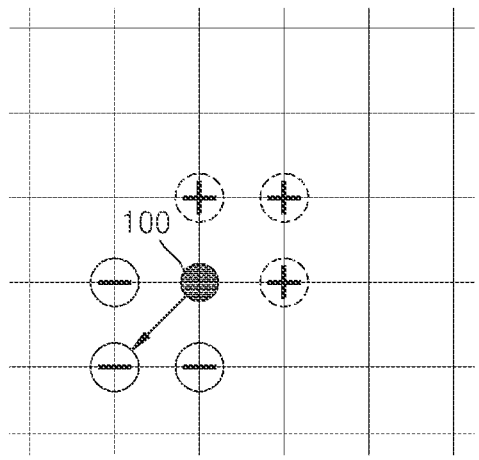
Figure 9B:
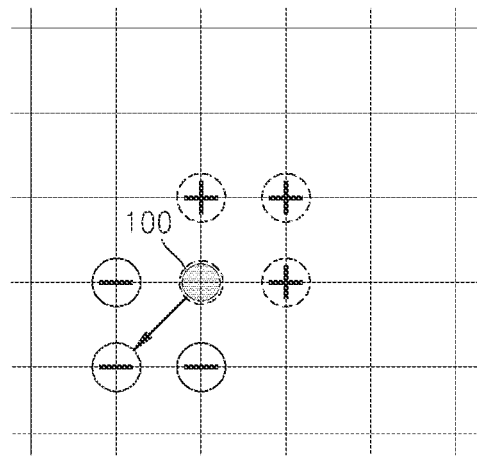
Figure 9C:
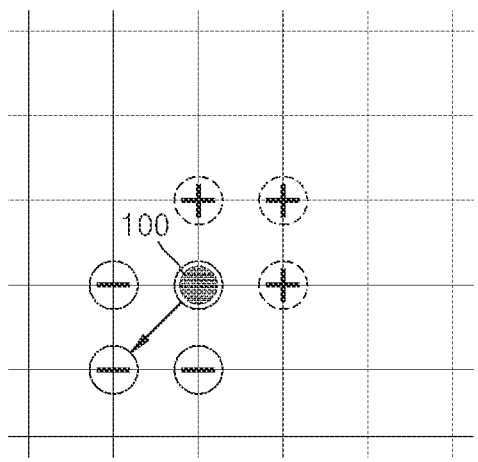

Referring to FIG. 9A, when the input tool 100 moves diagonally in between the wires arranged in a grid pattern, the device 1000 may generate a negative magnetic field in three coils disposed in the moving direction of the input tool 100, and a positive magnetic field in three coils disposed in a direction opposite to the moving direction of the input tool 100. Alternatively, the device 1000 may generate either a positive magnetic field, as shown in FIG. 9B, or a negative magnetic field, as shown in FIG. 9C, in a coil disposed in a location of the input tool 100.

Figure 10A:
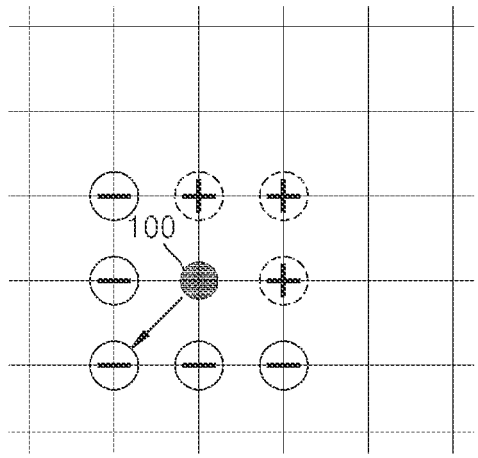
Figure 10B:
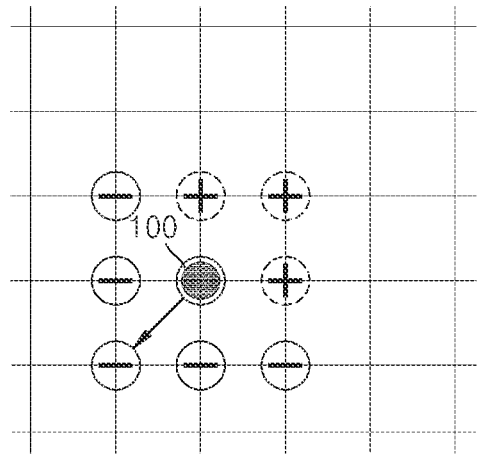
Figure 10C:
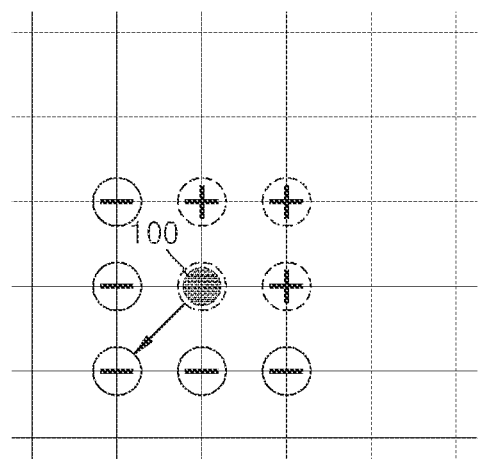

Referring to FIG. 10A, when the input tool 100 moves diagonally in between the wires arranged in a grid pattern, the device 1000 may generate a negative magnetic field in five coils disposed in the moving direction of the input tool 100, and a positive magnetic field in three coils disposed in a direction opposite to the moving direction of the input tool 100. Alternatively, the device 1000 may generate either a negative magnetic field, as shown in FIG. 10B, or a positive magnetic field, as shown in FIG. 10C, in a coil disposed at a location of the input tool 100.

As the number of coils in which a magnetic field is generated increases, a stronger repulsive force may be applied to the input tool 100. Accordingly, the device 1000 may adjust the number of coils in which a magnetic field is generated, with respect to the strength of a magnetic field generated by using the input tool 100 and a moving speed of the input tool 100.

FIGS. 11A through 14C illustrate examples in which the device 1000 generates a magnetic field in the second panel 1200 when the input tool 100 moves vertically on the second panel 1200 according to an embodiment of the present disclosure. In FIGS. 11A through 14C, the input tool 100 may have a negative magnetic polarity.

Figure 11A:
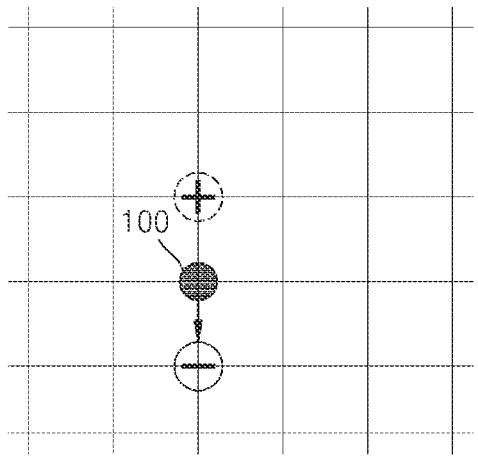
FIGS. 11A, 11B, 11C, 12A, 12B, 12C, 13A, 13B, 13C, 14A, 14B, and 14C illustrate examples in which a device generates a magnetic field in a second panel when an input tool moves vertically on the second panel according to an embodiment of the present disclosure.
Figure 11B:
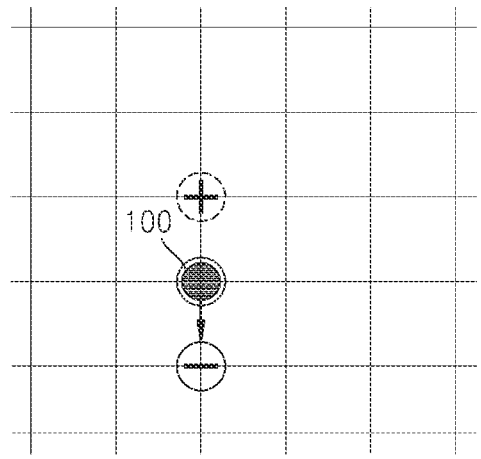
Figure 11C:
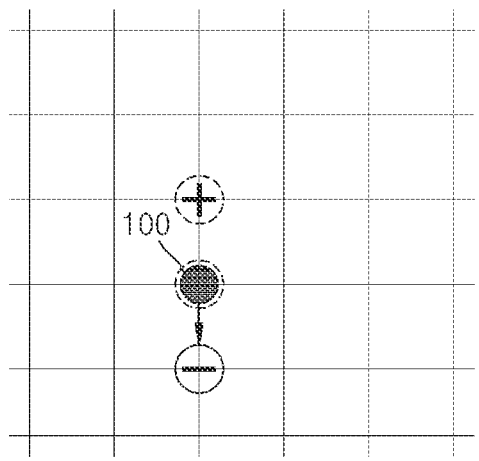

Referring to FIG. 11A, when the input tool 100 moves vertically in between wires arranged in a grid pattern, the device 1000 may generate a negative magnetic field in a coil disposed in a moving direction of the input tool 100, and a positive magnetic field in a coil disposed in a direction opposite to the moving direction of the input tool 100. Alternatively, the device 1000 may generate either a negative magnetic field, as shown in FIG. 11B, or a positive magnetic field, as shown in FIG. 11C, in a coil disposed at a location of the input tool 100.

Figure 12A:
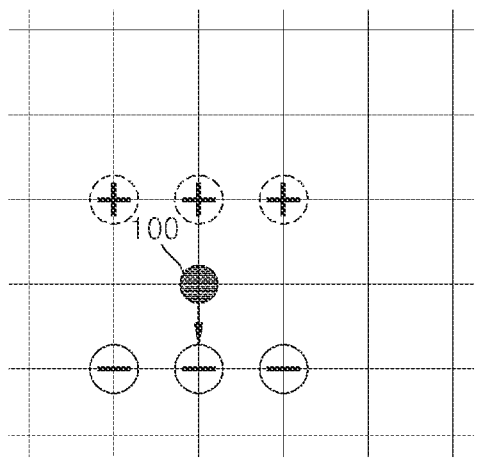
Figure 12B:
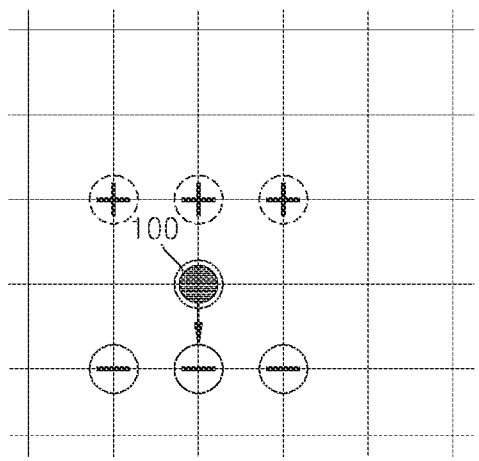
Figure 12C:
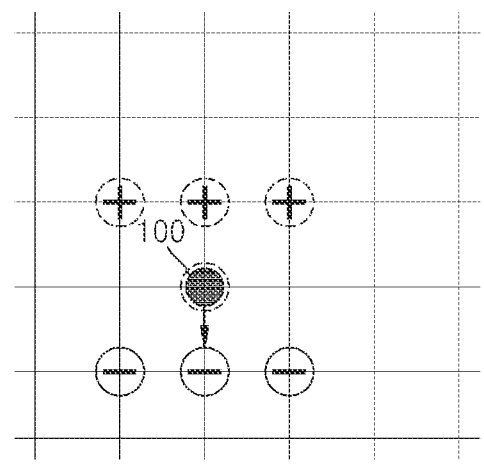

Referring to FIG. 12A, when the input tool 100 moves vertically in between wires arranged in a grid pattern, the device 1000 may generate a negative magnetic field in three coils disposed in the moving direction of the input tool 100, and a positive magnetic field in three coils disposed in a direction opposite to the moving direction of the input tool 100. Alternatively, the device 1000 may generate either a negative magnetic field, as shown in FIG. 12B, or a positive magnetic field, as shown in FIG. 12C, in a coil disposed at a location of the input tool 100.

Figure 13A:
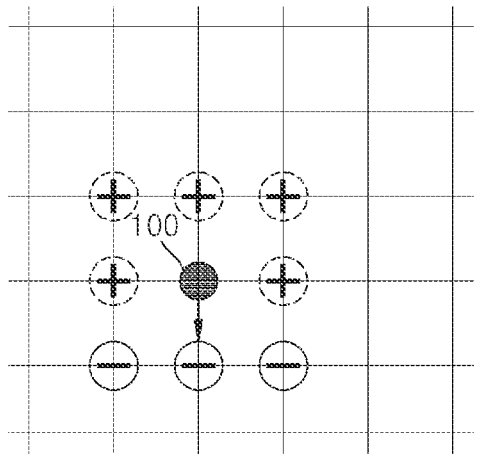
Figure 13B:
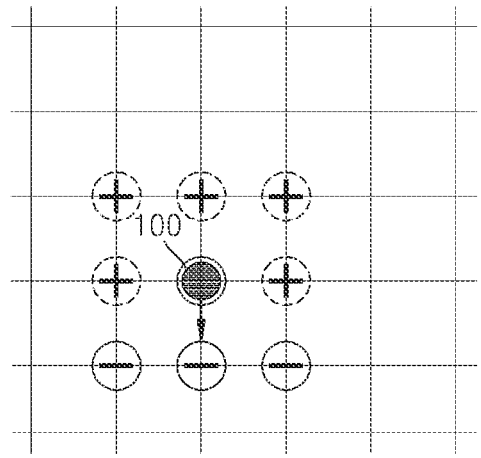
Figure 13C:
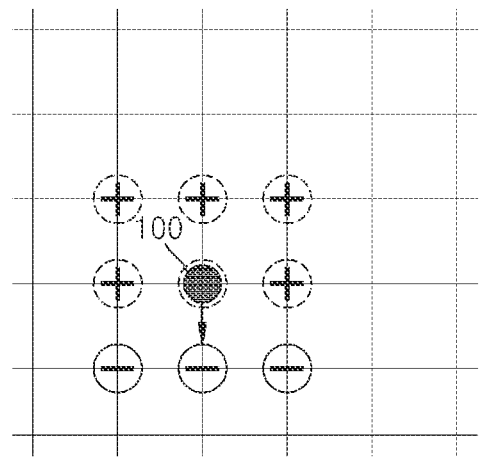

Referring to FIG. 13A, when the input tool 100 moves vertically in between wires arranged in a grid pattern, the device 1000 may generate a negative magnetic field in three coils disposed in the moving direction of the input tool 100; and generate a positive magnetic field in three coils disposed in a direction opposite to the moving direction of the input tool 100, and in two coils disposed adjacent to the input tool 100. Alternatively, the device 1000 may generate either a negative magnetic field, as shown in FIG. 13B, or a positive magnetic field, as shown in FIG. 13C, in a coil disposed at a location of the input tool 100.

Figure 14A:
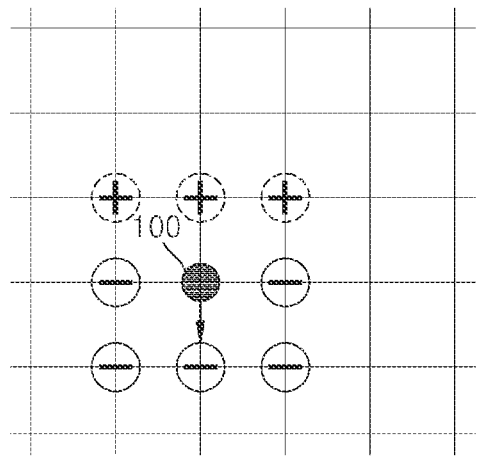
Figure 14B:
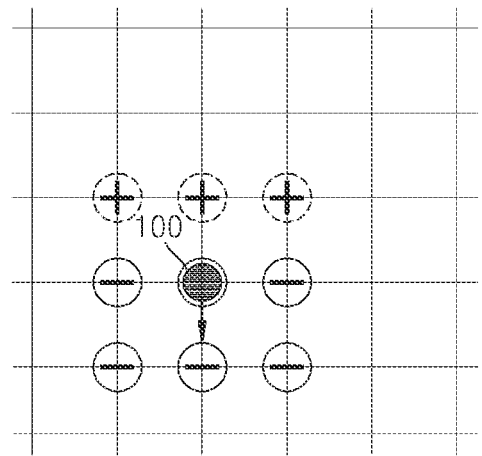
Figure 14C:
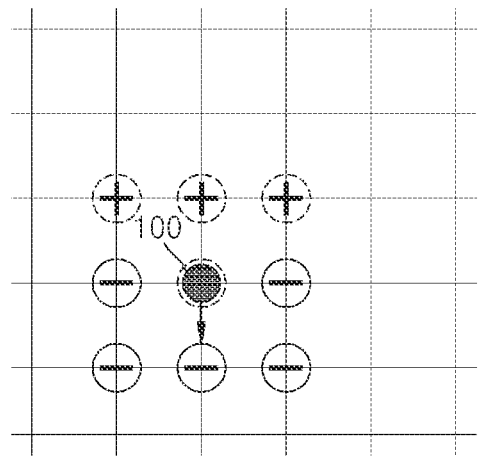

Referring to FIG. 14A, when the input tool 100 moves vertically in between wires arranged in a grid pattern, the device 1000 may generate a negative magnetic field in three coils disposed in the moving direction of the input tool 100, and in two coils disposed adjacent to the input tool 100; and generate a positive magnetic field in three coils disposed in a direction opposite to the moving direction of the input tool 100. Alternatively, the device 1000 may generate either a negative magnetic field, as shown in FIG. 14B, or a positive magnetic field, as shown in FIG. 14C, in a coil disposed at a location of the input tool 100.

As the number of coils in which a magnetic field is generated increases, a stronger repulsive force may be applied to the input tool 100. Accordingly, the device 1000 may adjust the number of coils in which a magnetic field is generated, with respect to the strength of a magnetic field generated by using the input tool 100 and a moving speed of the input tool 100.

Figure 15:
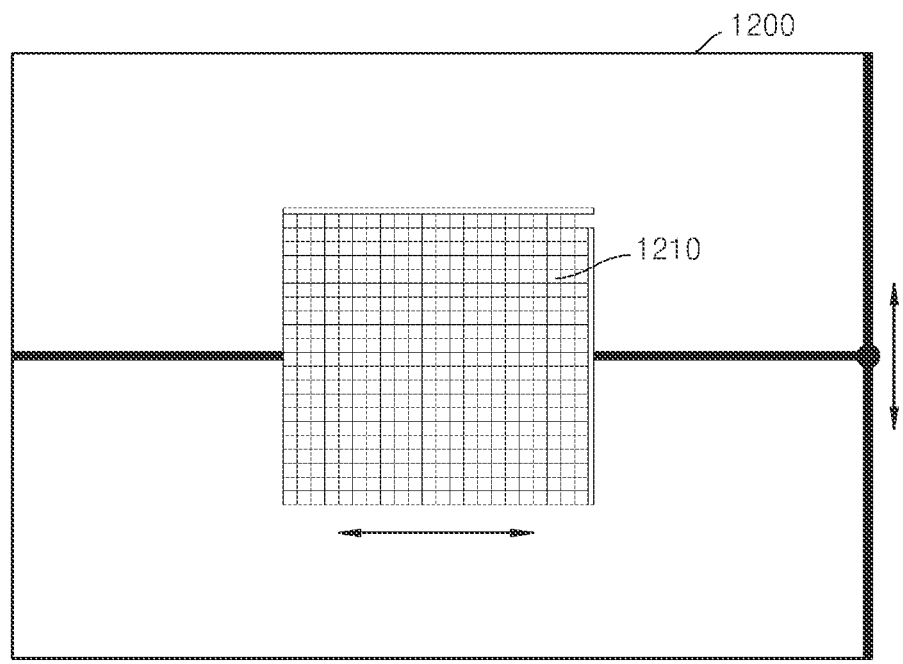
FIG. 15 illustrates an example in which a separate magnetic field generation apparatus, which is included in a second panel, is moved according to another embodiment of the present disclosure.

FIG. 15 illustrates an example in which a separate magnetic field generation apparatus 1210, which is included in the second panel 1200, is moved according to another embodiment of the present disclosure.

Referring to FIG. 15, the magnetic field generation apparatus 1210 may be included in the second panel 1200 according to another embodiment of the present disclosure. The magnetic field generation apparatus 1210 may include the vertically and horizontally arranged wires and the plurality of coils as described with reference to FIG. 4, and perform the features of the second panel 1200 as described with reference to FIG. 3.

The magnetic field generation apparatus 1210 may be smaller than the first panel 1100, and may be moved under the input tool 100 as a touch location of the input tool 100 on the first panel 1100 is moved. The control unit 1300 may identify a location of the input tool 100, move the magnetic field generation apparatus 1210 along a vertical axis and a horizontal axis, and accordingly, move the magnetic field generation apparatus 1210 to be under a touch location of the input tool 100. The control unit 1300 may use a motor or a belt to move the magnetic field generation apparatus 1210.

Figure 16:
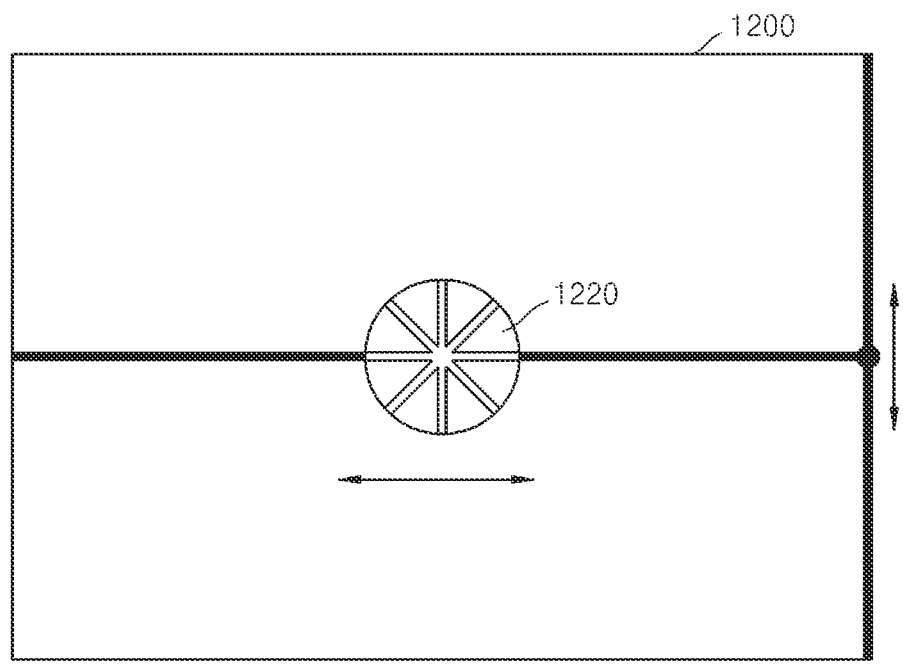
FIG. 16 illustrates an example in which a separate magnetic field generation apparatus, which is included in a second panel, is moved according to another embodiment of the present disclosure.

FIG. 16 illustrates an example in which a separate magnetic field generation apparatus 1220, which is included in the second panel 1200, is moved according to another embodiment of the present disclosure.

Referring to FIG. 16, the magnetic field generation apparatus 1220, which is included in the second panel 1200, according to another embodiment of the present disclosure, may be formed in a spherical shape, and a plurality of coils may be arranged in a crisscross pattern from the center of the sphere toward a circumference of the sphere. In addition, when the spherical magnetic field generation apparatus 1220 rotates, a magnetic field may be generated by the plurality of coils that are arranged in a crisscross pattern. Also, the device 1000 may adjust a rotation direction and a rotation speed of the magnetic field generation apparatus 1220 to adjust a polarity and strength of the generated magnetic field.

The magnetic field generation apparatus 1220 may include at least one of a stick-shaped permanent magnet. When the magnetic field generation apparatus 1220 rotates, a magnetic field may be generated by the permanent magnet.

The magnetic field generation apparatus 1220 may be smaller than the first panel 1100, and may be moved under the input tool 100 as a touch location of the input tool 100 on the first panel 1100 is moved. The control unit 1300 may identify a location of the input tool 100, move the magnetic field generation apparatus 1220 along a vertical axis and a horizontal axis, and accordingly, move the magnetic field generation apparatus 1220 to be under a touch location of the input tool 100. The control unit 1300 may use a motor or a belt to move the magnetic field generation apparatus 1220.

Figure 17:
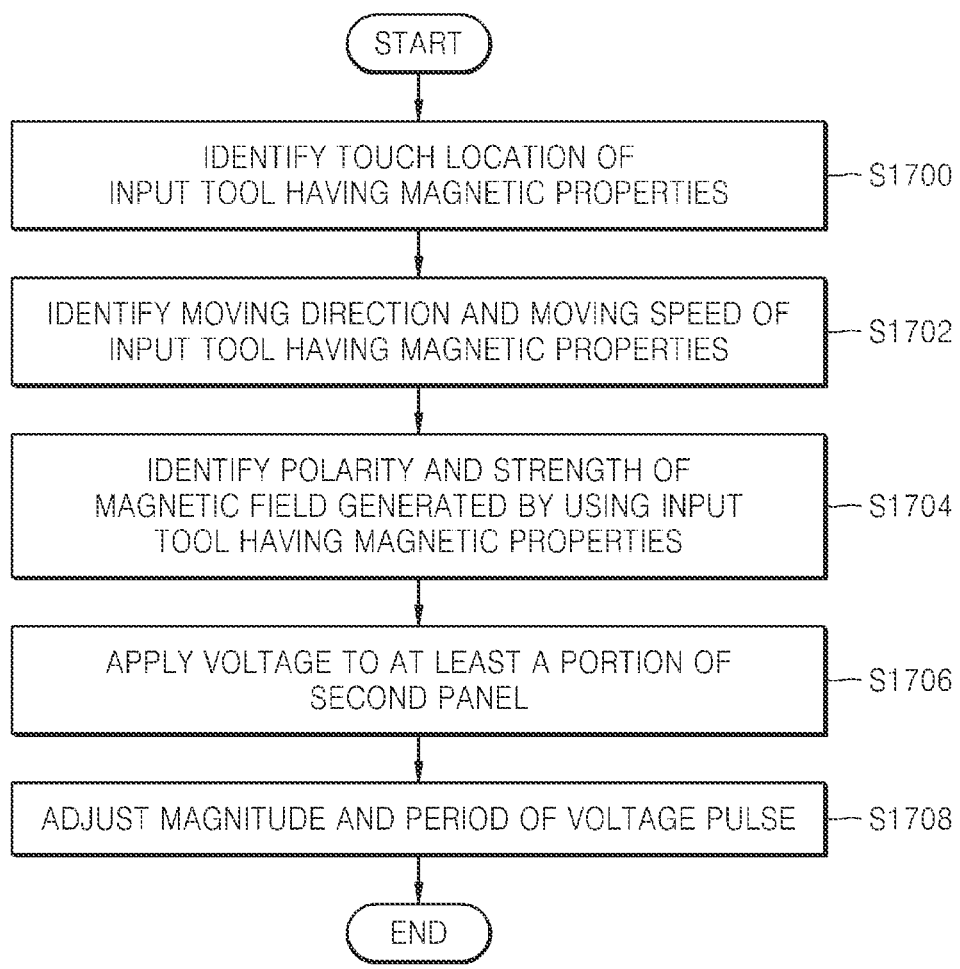
FIG. 17 is a flowchart illustrating a method in which a device generates a magnetic field on a second panel by responding to a touch input of an input tool according to an embodiment of the present disclosure.

FIG. 17 is a flowchart illustrating a method in which the device generates a magnetic field on the second panel 1200 by responding to a touch input of the input tool 100 according to an embodiment of the present disclosure.

In operation S1700, the device 1000 identifies a touch location of the input tool 100 having magnetic properties. When the first panel 1100 senses a touch of the input tool 100, the device 1000 may identify a touch location of the input tool 100, based on information that is generated when the first panel 1100 senses a touch of the input tool 100. For example, if the first panel 1100 is an R-type touch screen or a C-type touch screen, the first panel 1100 may sense a touch of the input tool 100.

Alternatively, when the first panel 1100 does not sense a touch of the input tool 100, the device 1000 may identify a touch location of the input tool 100, based on information that is generated when the second panel 1200 senses a touch of the input tool 100. As the input tool 100 touches the first panel 1100, a magnetic field may be generated in a predetermined region of the second panel 1200 due to the magnetic properties of the input tool 100, and accordingly, a predetermined electric field may be generated in a coil included in the second panel 1200 due to the generated magnetic field. Also, the device 1000 may identify a location of the coil in which the electric field is generated and the strength of the electric field generated in the coil, and thus may identify the touch location of the input tool 100. Furthermore, the electric field that is generated in the coil by using the input tool 100 having magnetic properties may be sensed or measured while a voltage is not applied to the coils.

In operation S1702, the device 1000 may identify a moving direction and a moving speed of the input tool 100 as a touch location of the input tool 100 is changed.

In operation S1704, the device 1000 identifies a polarity and strength of a magnetic field generated by using the input tool 100. When the first panel 1100 senses a touch of the input tool 100, the device 1000 may use the first panel 1100 to identify a polarity and strength of a magnetic field.

Also, when the first panel 1100 does not sense a touch of the input tool 100, the device 1000 may use the second panel 1200 to identify a polarity and strength of a magnetic field. As the input tool 100 touches the first panel 1100, a magnetic field may be generated in a predetermined region of the second panel 1200 due to the magnetic properties of the input tool 100, and accordingly, a predetermined electric field may be generated in a coil included in the second panel 1200 due to the generated magnetic field. Also, the device 1000 may identify a location of the coil in which the electric field is generated and the strength of the electric field generated in the coil, and thus may identify the touch location of the input tool 100. Furthermore, the electric field that is generated in the coil by using the input tool 100 having magnetic properties may be sensed or measured while a voltage is not applied to the coils.

In operation S1706, the device 1000 may apply a voltage to at least a portion of the second panel 1200. The device 1000 may select at least some of the coils included in the second panel 1200, based on a touch location, a moving direction, and a moving speed of the input tool 100, and thus may apply a voltage to the selected coils. In this case, the device 1000 may determine whether to apply a positive voltage or a negative voltage to the selected coils, with respect to a polarity of a magnetic field that is generated by using the input tool 100. Also, the device 1000 may apply a voltage pulse having a predetermined period to the selected coils.

In operation S1708, the device 1000 adjusts a magnitude and a period of a voltage pulse. The device 1000 may adjust the number of coils to which a voltage is applied and a magnitude of the voltage, based on the strength of a generated magnetic field and a moving speed of the input tool 100. When the device 1000 is applying a voltage pulse, the magnitude and period of the voltage pulse may be adjusted.

FIG. 18 is a flowchart illustrating a method in which the device 1000 moves the magnetic field generation apparatuses 1210 and 1220, which are included in the second panel 1200, by responding to a touch input of the input tool 100 according to another embodiment of the present disclosure.

In operation S1800, the device 1000 identifies a touch location of the input tool 100 having magnetic properties. The device 1000 may identify the touch location of the input tool 100, based on information that is generated when the first panel 1100 senses a touch of the input tool 100. For example, if the first panel 1100 is an R-type touch screen or a C-type touch screen, the first panel 1100 may sense a touch of the input tool 100.

In operation S1810, the device 1000 may identify a moving direction and a moving speed of the input tool 100 as a touch location of the input tool 100 is changed.

In operation S1820, the device 1000 uses the first panel 1100 to identify a polarity and strength of a magnetic field generated by using the input tool 100.

In operation S1830, the device 1000 generates a magnetic field in the magnetic field generation apparatuses 1210 and 1220. The device 1000 may determine a polarity of a magnetic field to be generated in the magnetic field generation apparatuses 1210 and 1220, based on a polarity of a magnetic field that is generated by using the input tool 100.

When the magnetic field generation apparatus 1210 includes a plurality of coils which are arranged in a grid pattern, the device 1000 may generate a magnetic field in the magnetic field generation apparatus 1210 by applying a predetermined voltage to the plurality of coils.

When the magnetic field generation apparatus 1220 is formed in a spherical shape, and the plurality of coils are arranged in a crisscross pattern from the center of the sphere toward a circumference of the sphere, the device 1000 may generate a magnetic field by rotating the magnetic field generation apparatus 1220. Alternatively, when the magnetic field generation apparatus 1220 includes at least one of a stick-shaped permanent magnet, the device 1000 may generate a magnetic field by rotating the magnetic generation apparatus 1220.

In operation S1840, the device 1000 adjusts a magnitude of a generated magnetic field. The device 1000 may adjust the magnitude of the magnetic field generated in the magnetic field generation apparatuses 1210 and 1220, based on the strength of the generated magnetic field and a moving speed of the input tool 100.

In operation S1850, the device 1000 moves the magnetic field generation apparatuses 1210 and 1220. As the input tool 100 is moved, the device 1000 may move the magnetic field generation apparatuses 1210 and 1220 to a location to which the input tool 100 is moved or will be moved, according to a touch location, a moving direction, and a moving speed of the input tool 100.

Various embodiments of the present disclosure may be implemented in the form of a non-transitory computer-executable recording medium including commands such as a computer-executable program module. A non-transitory computer-readable medium may be an arbitrary medium that may be accessed by a computer, and includes volatile and nonvolatile media and separable and non-separable media. Also, the non-transitory computer-readable medium may include a computer recording medium and a communication medium. The non-transitory computer recording medium includes volatile and nonvolatile media and separable and non-separable media that are embodied by using an arbitrary method or technology for storing information such as a computer-readable command, a data structure, a program module, or other data. The communication medium generally includes a computer-readable command, a data structure, a program module, other data of a modulated data signal, or other transmission mechanisms, and the communication medium includes an arbitrary information transmission medium.

While the present disclosure has been shown and described with reference various embodiments thereof, it will be understood by those of skill in the art that various changes in form and details may be made therein without departing from the spirit and scope of the present disclosure as defined by the appended claims and their equivalents.

What is claimed is:

1. A touch input device comprising:
    a first panel configured to be touched by an input tool having magnetic properties;
    a second panel configured to generate a magnetic field; and
    a control unit configured to control the second panel to generate the magnetic field in a portion of the second panel that is related to a touched location of the first panel, based on a moving direction of the input tool on the first panel,
    wherein the control unit is configured to control the second panel to generate the magnetic field, which has the same polarity as a polarity of the input tool, in a portion of the second panel that is in the moving direction of the input tool and generate a magnetic field, which has a polarity opposite to a polarity of the input tool, in a portion of the panel that is in the opposite direction of the moving direction of the input tool.

2. The touch input device of claim 1, wherein the second panel comprises a plurality of coils, and
    wherein the control unit is further configured to control to apply a voltage to at least some of the plurality of coils to generate the magnetic field.

3. The touch input device of claim 2, wherein the control unit is further configured to control to apply a voltage pulse having a predetermined period to at least some of the plurality of coils to generate the magnetic field.

4. The touch input device of claim 3, wherein as the input tool touches and is moved along the first panel, the control unit is further configured to adjust at least one of a period of the voltage pulse and a magnitude of the voltage pulse, based on a moving speed of the input tool.

5. The touch input device of claim 2, wherein the control unit is further configured to:
    identify a magnetic field that is generated in at least some of the plurality of coils as the input tool is touched, and
    identify at least one of a touch location, a moving direction, and a moving speed of the input tool.

6. The touch device of claim 5, wherein the control unit is further configured to:
    control to apply a voltage pulse having a predetermined period to at least some of the plurality of coils, and
    identify, when a magnitude of the applied voltage equals zero, at least one of a touch location, a moving direction, and a moving speed of the input tool.

7. The touch input device of claim 2, wherein the plurality of coils are arranged in the second panel in a grid pattern.

8. The touch input device of claim 1, wherein the first panel comprises at least one of a protective panel and a display panel.

9. A touch input device comprising:
    a first panel configured to receive a touch input of an input tool having magnetic properties;
    a second panel configured to generate a magnetic field corresponding to the input of the input tool; and
    a control unit configured to control the second panel to generate the magnetic field in a portion of the second panel that is related to a touch input location based on a moving direction of the input tool on the first panel,
    wherein the control unit is configured to control the second panel to generate the magnetic field, which has the same polarity as a polarity of the input tool, in a portion of the second panel that is in the moving direction of the input tool and generate a magnetic field, which has a polarity opposite to a polarity of the input tool, in a portion of the panel that is in the opposite direction of the moving direction of the input tool.

10. The touch input device of claim 9, wherein the control unit is further configured to:

receive information regarding a touch input from the first panel, and control the first panel to generate the magnetic field in the portion of the second panel, based on the received information.

11. The touch input device of claim 9, wherein the first panel comprises at least one of a Resistive (R)-type touch screen and a Capacitive (C)-type touch screen.

12. A touch input method comprising:
identifying a location of a first panel that is touched by an input tool having magnetic properties; and
applying a voltage to a portion of a second panel that is related to the identified touch location, as the input tool touches the first panel,
wherein a magnetic field is generated in the portion of the second panel as the voltage is applied, based on a moving direction of the input tool, and
wherein in the applying of the voltage, the voltage is applied to generate the magnetic field, which has the same polarity as a polarity of the input tool, in the portion of the second panel that is in the moving direction of the input tool and the voltage is applied to generate the magnetic field, which has a polarity opposite to a polarity of the input tool, in a portion of the second panel that is in the opposite direction of the moving direction of the input tool.

13. The touch input method of claim 12, wherein in the applying of the voltage, the voltage is applied to at least some of a plurality of coils included in the second panel.

14. The touch input method of claim 13, wherein in the applying of the voltage, a voltage pulse having a predetermined period is applied to at least some of the plurality of coils to generate the magnetic field.

15. The touch input method of claim 14, wherein in the applying of the voltage, as the input tool touches and is moved along the first panel, at least one of a period of the voltage pulse and a magnitude of the voltage pulse is adjusted, based on a moving speed of the input tool.

16. The touch input method of claim 13, wherein in the identifying of the touch location, the touch location is identified by identifying the magnetic field formed by at least some of the plurality of coils, and
further comprising identifying at least one of a touch location, a moving direction, and a moving speed of the input tool.

17. The touch input method of claim 16, wherein in the applying of the voltage, a voltage pulse having a predetermined period is applied to at least some of the plurality of coils, and
wherein at least one of a touch location, a moving direction, and a moving speed of the input tool is identified when a magnitude of the applied voltage equals zero.

18. The touch input method of claim 13, wherein the plurality of coils is arranged in the second panel in a grid pattern.

19. The touch input method of claim 12, wherein the first panel comprises at least one of a protective panel and a display panel.

20. A non-transitory computer-readable recording medium having a program thereon for executing the method of claim 15.

* * * * *